(12) United States Patent
Marshall

(10) Patent No.: US 7,531,480 B2
(45) Date of Patent: May 12, 2009

(54) SORBENT ADDITIVE AND COMPOSITION

(76) Inventor: Stephen Marshall, 6340 Mary Lake Ct., Tallahassee, FL (US) 32311

( * ) Notice: Subject to any disclaimer, the term of this patent is extended or adjusted under 35 U.S.C. 154(b) by 703 days.

(21) Appl. No.: 11/313,040

(22) Filed: Dec. 20, 2005

(65) Prior Publication Data

US 2006/0124070 A1 Jun. 15, 2006

Related U.S. Application Data

(63) Continuation-in-part of application No. 10/224,042, filed on Aug. 20, 2002, now abandoned.

(51) Int. Cl.
*B01J 20/00* (2006.01)
(52) U.S. Cl. ...................... 502/404; 502/401
(58) Field of Classification Search ................. 502/400, 502/401, 404, 526
See application file for complete search history.

(56) References Cited

U.S. PATENT DOCUMENTS

| | | |
|---|---|---|
| 4,333,461 A | 6/1982 | Muller |
| 4,624,868 A | 11/1986 | Muller |
| 5,183,010 A | 2/1993 | Raymond et al. |
| 5,193,489 A | 3/1993 | Hardin |
| 5,532,350 A | 7/1996 | Cottrell et al. |
| 5,762,023 A | 6/1998 | Carter |

*Primary Examiner*—Edward M Johnson
(74) *Attorney, Agent, or Firm*—J. Wiley Horton

(57) ABSTRACT

An additive formulated for blending with bulk absorbent materials to cause the absorbent materials to agglomerate upon the introduction of urine or waste products. The invention also comprises mixtures of the additive with the conventional absorbent materials. The additive itself comprises: a polysaccharide, such as a galactomannan gum; a borate compound for use as a cross-linking agent; a dicarboxylic acid in order to acidify the pH of the additive; and preferably a flow control element such as silica. An additional element may also be added to assist in fixing the additive to the absorbent materials, to control dust during the mixing process, and to improve the flow of the material when poured out of a container by the end user.

33 Claims, No Drawings

SORBENT ADDITIVE AND COMPOSITION

CROSS-REFERENCES TO RELATED APPLICATIONS

This application is a continuation in part of U.S. application Ser. No. 10/224,042, filed Aug. 20, 2002 now abandoned. The prior application listed the same inventor. The prior application remained pending as of the time of this filing.

STATEMENT REGARDING FEDERALLY SPONSORED RESEARCH OR DEVELOPMENT

Not Applicable.

MICROFICHE APPENDIX

Not Applicable

BACKGROUND OF THE INVENTION

1. Field of the Invention

This invention relates to the field of sorbent compositions. More specifically, the invention comprises an additive which can be mixed with conventional sorbent materials to provide agglomeration upon contact with liquids, such as animal urine. The invention also comprises mixtures of the additive with conventional sorbent materials.

2. Description of the Related Art

Sorbent compositions for control of animal waste have long been known in the art. These have typically used particulated clays to absorb liquids. In recent years, cross-linking formulations which cause the agglomeration of the particles upon contact with liquids have been developed. One such formulation is disclosed in U.S. Pat. No. 5,762,023 to Carter (1998), which patent is incorporated herein by reference.

The prior art formulations typically produce clumps within the particulated sorbent composition, thereby allowing the user to remove only the contaminated portion of the litter. The adhesive strength and durability of these clumps ("clump strength") are important to the success of a litter product. Obviously, the cost of the formulation used is also important to the commercial success of the product.

BRIEF SUMMARY OF THE INVENTION

The present invention comprises an additive formulated for blending with conventional absorbent materials to cause the materials to agglomerate upon the introduction of liquids such as urine. The invention also comprises mixtures of the additive with the conventional absorbent materials. The additive itself comprises: a polysaccharide, such as a galactomannan gum; a borate compound for use as a cross-linking agent; a dicarboxylic acid in order to acidify the pH of the composition; and preferably a flow control element such as silica. A dust control element may also be added to assist in fixing the additive to the absorbent materials and to benefit the consumer during pouring and use of the absorbent material.

DETAILED DESCRIPTION OF THE INVENTION

Animal litter products use a high percentage of conventional absorbent materials for purposes of water/urine absorption. Examples of these materials are various particulated clays, cellulose fiber, cellulose fluff, peat moss, paper, wood fluffs, and mixtures thereof. These materials are present simply to absorb moisture and act as a "litter substrate" for other materials providing more sophisticated features. In a sorbent composition such as the present invention, these conventional absorbent materials typically comprise 95 to 99.8% of the composition by weight.

The conventional absorbent materials are bulky and heavy, meaning that transportation and storage present substantial economic concerns. It is often desirable to create litter compositions near the anticipated markets, so that transportation costs do not destroy the economic viability of the product.

The remaining materials in the composition—typically comprising only 0.2% to 5% by weight—are more easily transported to litter manufacturing sites around the world. These remaining materials can be described as an "additive," since they are blended into the bulky conventional absorbent materials during the final stages of the manufacturing process. Such additives can be formulated for combining with specific conventional absorbent materials, or with a group of conventional absorbent materials. Thus, the additives—which have specific and well-controlled chemical compositions—can be manufactured in a relatively sophisticated plant, then shipped to the site of manufacturing for the final litter product and blended into the conventional absorbent materials.

A suitable additive for addition to form a clumpable litter comprises a polysaccharide having a mean particle size of less than 200 mesh, a boron based cross-linking agent, and a dicarboxylic acid to acidify the composition and cause the crosslinking and clump formation to proceed at a faster rate. A dry flow aid may also be desirable. As mentioned above, the additive is intended to be mixed into a much larger amount of conventional absorbent materials. Depending upon the attrition tendencies and receptive nature of the substrate, it may also be desirable to add a dust control agent to assist in fixing the additive to the absorbent materials, to control dust during the mixing process, and to benefit the consumer when pouring the material.

One particularly suitable polysaccharide is a galactomannan gum. Such gums include guar gum, derivatised guar gum, xanthum gum, and locust bean gum, with guar gum being the preferred choice. The guar gum used can include ordinary guar gum, hydroxypropyl guar, hydroxyethyl guar, carboxymethyl guar, carboxymethyl hydroxypropyl guar, guar hydroxypropyltrimonium chloride, and mixtures thereof. Another possible polysaccharide is a sodium alginate.

The boron-based clumping agent is selected from the group including borates, metaborates, and perborates. Anhydrous borax, $Na_2B_4O_7$ (having the IUPAC name "sodium tetraborate"), is particularly effective. Other possibilities include sodium metaborate, $NaBO_2$; sodium metaborate, tetrahydrate, $NaBO_2,4H_2O$; sodium perborate, $NaBO_2, H_2O_2, 3H_2O$ (having the IUPAC name "sodium metaborate, peroxyhydrate"); borax, $Na_2B_4O_7,10H_2O$ (having the IUPAC name "sodium tetraborate, decahydrate); and sodium tetraborate, pentahydrate, $Na_2B_4O_7,5H_2O$.

Various carboxylic acids can be used to acidify the composition. Adjusting the pH of the composition is important in the promotion of the cross-linking needed for agglomeration. Suitable dicarboxylic acids include (IUPAC names are shown in parentheses or, where no common name is used, presented as the primary name): oxalic acid (ethanedioic acid), succinic acid (butanedioic acid), adipic acid (hexanedioic acid), pimelic acid (heptanedioic acid), suberic acid (octanedioic acid), azelaic acid (nonanedioic acid), sebacic acid (decanedioic acid), fumaric acid (trans-butenedioic acid), phthalic acid (1,2-benzenedicarboxylic acid), malonic acid (propanedioic acid), glutaric acid (pentanedioic acid), maleic acid (cis-butanedioic acid), undecyclic acid (undecanoic acid), lauric acid (dodecanoic acid), myristic acid (tetradecanoic acid), pentadecyclic acid (pentadecanoic acid), and tridecanoic acid.

While many such dicarboxylic acids could work in the proposed formulation, commercial availability and cost are obviously important considerations. The butene-derived dicarboxylic acids have been found particularly effective. These are fumaric acid (trans-butenedioic acid) and maleic acid (cis-butenedioic acid)). These two compounds are stereo isomers, and as would be expected, their performance in the formulation is similar. The low water solubility of these two acids is believed to promote enhanced clumping performance when cat urine is added to the composition. Succinic acid has also been found to be particularly effective.

The reader will recall that the present invention contemplates a specialized additive which is designed to be mixed into conventional bulk absorbent materials in order to form a clumping animal litter. The particle size distribution of the additive versus the bulk absorbent materials is significant. Particulated clay is a good example of a bulk absorbent material. It typically has a particle size between about 8 and 50 mesh. Conventional cross-linking absorbent compositions, such as the one disclosed in U.S. Pat. No. 5,801,116 to Cottrell (1998), have used a similar particle size for the galactomannan gum.

The present invention employs a much smaller particle size for the galactomannan gum. The use of small particles for the additive composition is essential to promote the quick formation of clumps when animal urine or feces is added to the sorbent composition. The specialized additive is blended evenly into the bulk materials. The small particle size of the additive, compared to the relatively larger particle size of the bulk materials, allows the even distribution of the additive particles throughout the blend. The additive particles are uniformly distributed throughout the interstices of the larger absorbent particles (such as clay particles).

Within each void between the larger clay particles (with clay being only an example of the various bulk absorbent materials) will be found the smaller particles of the specialized additive. All the ingredients of the specialized additive will typically be found in each gap. Thus, a "micro environment" is formed, with this micro environment containing the galactomannan gum, the borate compound, the dicarboxylic acid, and possibly other additives. These compounds are in close physical contact with the surrounding clay particles.

When animal urine or feces is added, the presence of the dicarboxylic acid creates a pH-altered microenvironment which produces significantly enhanced cross linking, binding the surrounding larger clay particles. The specialized additive compounds are not really used for any absorbent properties (though they may have such capacity). The bulk absorbent material comprise 97 to 99.8% of the final sorbent composition. The bulk materials are used to absorb moisture. The specialized additive is present for its ability to produce suitable clumps upon the addition of urine or feces. The very fine galactomannan particles are in effect a dispersed cement.

As mentioned previously, the specialized additive can include other components to further enhance its performance. A dry flow aid can be added to decrease the additives angle of repose thus permitting an ease of flow from storage bins during the blending process. The dry flow aid employed is preferably silica, with precipitated silica or fumed silica being appropriate choices. A dust control agent can also be included, with polytetrafluoroethylene (PTFE) being the preferred agent, to assist in fixing the additive to the absorbent materials and to benefit the consumer during pouring and use of the absorbent material. A water dispersable non-ionic vinyl polymer can also be used as a dust control agent.

A typical manufacturing process for the additive is vigorous blending of the polysaccharide, the boron-based clumping agent, the dicarboxylic acid, and the dry flow aid. The order of mixing is unimportant, so long as vigorous blending or possibly milling is used. Some boron-based clumping agents have a tendency to pick up moisture and form small clumps when they come in contact with the polysaccharide. Thus, it is best to process the mixture so that these clumps are ground back into an evenly dispersed particulate. One approach is to blend the polysaccharide, dicarboxylic acid, and dry flow aid together thoroughly before adding the boron-based clumping agent. In this way, the other ingredients, particularly the dry flow agent, help dry out the polysaccharide before the addition of the boron-based clumping agent.

Once the additive is manufactured, it can be stored for subsequent blending into a much larger quantity of conventional absorbent materials. When the conventional absorbent material is a clay product (a common choice), dust control becomes an important consideration. A good approach to dust control is to spray the conventional absorbent material with an aqueous suspension of PTFE at the rate of 1 to 2 pounds of PTFE per ton of conventional absorbent material (This process has also been found to assist in fixing the additive to the conventional absorbent material). The amount of water used should obviously be minimized, with 10 to 20 pounds of water per ton of conventional absorbent material generally being adequate.

Once the dust control component has been added, the additive can be mechanically blended into the conventional absorbent material in order to make a finished litter product. A simple screw auger or screw conveyor can be used to accomplish this task. The powder additive is typically blended at the rate of between 0.2% and 3% by weight into the conventional absorbent material (4-60 pounds of additive per ton of conventional absorbent material).

Other prior art blending methods, such as ribbon blending or cut and fold plowing, can be used. The objective is to get a thorough mixing of the powder additive with the conventional absorbent material ("litter substrate"), without breaking up the litter too much and forming unwanted dust. The preferred approach would be a continuous flow device although a batch system could also be used.

EXAMPLE ONE

A formula for the additive, stated as a percentage of total weight:

| Ingredient | % by weight |
| --- | --- |
| Guar gum | 72-73 |
| Anhydrous borax | 12 |
| Fumaric or Succinic acid | 15 |
| Precipitated or fumed silica | 0.5-1 |

A separate aqueous suspension of PTFE is applied to the conventional absorbent material (for dust control) at the rate of 1-2 pounds of PTFE per ton of litter substrate. This formulation is particularly effective for use with a particulated clay litter substrate, such as Porter's Creek calcium montmorillonite, Georgia attapulgite, opaline silica from the Monterrey formation of California, Spanish sepiolite from Tolsa in Spain, clays from the United Kingdom, and clays from South Africa.

As stated previously, particle size plays a significant role in keeping the additive well blended and in clump formation. The litter substrate should have particles in the range of 8 to 50 mesh. A 12 or 14 by 40 mesh is suitable. Allowing a particle size down to 50 mesh helps keep the powder additive normally distributed within the litter substrate. However, if the particles are too small, thin and flat surface clumps result. These are deemed undesirable due to a tendency to break during transportation and a reduction in the clay's ability to absorb odors.

Of course, the guar gum particle size should be much smaller. Guar gum powders have a distribution of particle sizes. A guar gum powder having a particle size distribution such that 90% or more of the powder will pass through a 200 mesh U.S. standard sieve should be used.

The anhydrous borax will typically have a wider particle size distribution, but the use of a smaller mean particle size is again important. The particle size distribution should be such that at least 95% of the anhydrous borax will pass through a 50 mesh U.S. standard sieve and at least 70% of the anhydrous borax will pass through a 200 mesh U.S. standard sieve.

The selection of a dicarboxylic acid having a low solubility in water is believed to be important. The use of such an acid allows the urine to penetrate more deeply into the litter substrate before forming a harder "puck" shaped clump that is easily removed and transported. Fumaric acid or succinic acid are used in the preferred embodiment. Either acid may be used, preferably in a nearly pure state prior to blending. A small particle size is needed for the dicarboxylic acid component as well, with the distribution being selected such that at least 90% will pass through a 100 mesh U.S. sieve.

The precipitated or fumed silica is used as a dry flow aid. A small particle size is again preferred, with at least 99% of the fumed silica passing through a 100 mesh U.S. standard sieve. The silica preferably has at least 87% $SiO_2$ hydrate by weight.

EXAMPLE TWO

The specific composition of the ingredients in the additive can vary within a fairly large range. In general, the polysaccharide should be 70% to 80% of the total weight of the additive, and should be 5 to 6 times the amount of the boron based clumping agent. The dicarboxylic acid should be at least 10% of the total weight of the additive, but need not exceed 20%. Accordingly, the following formulation is effective:

| Ingredient | % by weight |
| --- | --- |
| Guar gum | 70-80 |
| Anhydrous borax | 10-17 |
| Fumaric acid | 10-20 |
| Precipitated or fumed silica | 1 |

The aforementioned particle size distributions are present in all of the examples given.

EXAMPLE THREE

As discussed previously, the additive is intended to be mixed into a conventional absorbent material. In this example, the additive of EXAMPLE ONE is blended with Georgia attapulgite clay in the ratio of 2% by weight of additive to the clay. A control sample was also prepared excluding the Fumaric acid.

Cat urine was applied to both formulations, resulting in clumping agglomeration. The clump strength was tested used a Chatillion gage to measure the amount of force required to break the clump (via shearing action). A higher strength is obviously desirable.

The tests were performed at one hour after the urine was added and 24 hours after the urine was added. The results of these tests were as follows:

|  | No Acid | | With Fumaric Acid | |
| --- | --- | --- | --- | --- |
|  | 1 hr | 24 hr | 1 hr | 24 hr |
| Clump Strength (psi) | 0.47 | 5.32 | 0.64 | 10.4 |

The addition of the dicarboxylic acid to shift the pH of the composition was obviously significant.

EXAMPLE FOUR

A similar control study was performed using the additive of EXAMPLE ONE and Spanish Sepiolite clay from Tolsa (Sepiolite clays, which do not naturally form lumps, are known to be more absorbent by weight than sodium bentonite clays—although sodium bentonite clays provide more natural clumping). Shorter time measurements were taken in order to quantify the suspected faster clumping. The results of these tests (conducted at 3% by weight additive to litter substrate) were as follows:

|  | No Acid | | | | With Fumaric Acid | | | |
| --- | --- | --- | --- | --- | --- | --- | --- | --- |
|  | 15 min | 1 hr | 2 hr | 24 hr | 15 min | 1 hr | 2 hr | 24 hr |
| Clump Strength (psi) | 0.21 | 0.41 | 0.75 | 6.18 | 0.42 | 0.75 | 1.02 | 12.00 |

The addition of fumaric acid (a dicarboxylic acid) significantly improves the clumpability of this material, thus providing clumping performance closer to a sodium bentonite clay while providing the greater absorbency per pound of a Sepiolite clay.

EXAMPLE FIVE

With the advantage of the fumaric acid being apparent, additional clay samples were evaluated using the additive with fumaric acid. The additive of EXAMPLE ONE was mixed with Porter's Creek Calcium at the rate of 3% additive to litter substrate by weight. The results were as follows:

|  | With Fumaric Acid | | | |
| --- | --- | --- | --- | --- |
|  | 15 min | 1 hr | 2 hr | 24 hr |
| Clump Strength (psi) | 0.37 | 0.36 | 3.88 | 8.53 |

EXAMPLE SIX

The additive of EXAMPLE ONE was mixed with clay from the United Kingdom at the rate of 3% additive to litter substrate by weight. The results were as follows:

|  | With Fumaric Acid | |
|---|---|---|
|  | 1 hr | 24 hr |
| Clump Strength (psi) | 0.54 | 4.31 |

EXAMPLE SEVEN

The additive formulation disclosed in U.S. Pat. No. 5,762, 023 to Carter (1998), teaches the crosslinking of galactomannan gums using borax, a technology that was in common use and cited in many prior art formulations. The Carter patent has found some commercial application. However, its clumping speed and hardness has been criticized within the industry. It was therefore desired to compare the present invention to this prior art formulation. Accordingly, the additive of EXAMPLE ONE was blended with a clay substrate (California Monterrey Shale) at the ratio of 2% by weight and 3% by weight. Likewise, the additive of the Carter patent was added to the same substrate at the ratio of 2% by weight and 3% by weight. The clump strength (in psi) of the different formulations were then tested over time. The results were as follows:

| Time | EX 1 (2%) | EX 1 (3%) | Carter (2%) | Carter (3%) |
|---|---|---|---|---|
| 15 min | 0.67 | 0.65 | 0.51 | 0.48 |
| 1 hr | 1.11 | 1.60 | 0.70 | 0.54 |
| 24 hr | 10.7 | 9.38 | 8.65 | 8.85 |

The fact that lowering the amount of additive actually improved the performance is not necessarily true for different litter substrates. It was true, however, for this particular California Monterrey Shale.

The preceding description contains significant detail regarding the novel aspects of the present invention. It is should not be construed, however, as limiting the scope of the invention but rather as providing illustrations of the preferred embodiments of the invention. Thus, the scope of the invention should be fixed by the following claims, rather than by the examples given.

The invention claimed is:

1. An additive for use in an absorbent composition to promote clumping and facilitate subsequent removal of urine in said absorbent composition comprising:
   a. a galactomannan gum powder having a particle size distribution allowing at least 90% of said galactomannan gum powder to pass through a 200 mesh sieve;
   b. a sufficient amount of a borate compound to provide cross linking of said absorbent composition upon the addition of said urine; and
   c. a sufficient amount of dicarboxylic acid, to lower the pH of said additive to a level where said borate compound and said galactomannan gum powder agglomerate said absorbent composition upon the introduction of said urine.

2. An additive as recited in claim 1, further comprising a silica.

3. A composition of matter wherein the additive of claim 1 is blended with a conventional absorbent material, wherein said conventional absorbent material has a particle size between 8 and 50 mesh.

4. A composition of matter wherein the additive of claim 1 is blended with a conventional absorbent material and a dust control component.

5. A composition of matter wherein the additive of claim 2 is blended with a conventional absorbent material, wherein said conventional absorbent material has a particle size between 8 and 50 mesh.

6. A composition of matter wherein the additive of claim 2 is blended with a conventional absorbent material and a dust control component.

7. A composition of matter wherein the additive of claim 1 is blended with a conventional absorbent material in the ratio of between 0.2% and 3% by weight of additive to conventional absorbent material.

8. A composition of matter wherein the additive of claim 2 is blended with a conventional absorbent material in the ratio of between 0.2% and 3% by weight of additive to conventional absorbent material.

9. A composition of matter wherein the additive of claim 1 is blended with a conventional absorbent material and a dust control component in the ratio of between 0.2% and 3% by weight of additive to conventional absorbent material.

10. A composition of matter wherein the additive of claim 2 is blended with a conventional absorbent material and a dust control component in the ratio of between 0.2% and 3% by weight of additive to conventional absorbent material.

11. An absorbent composition as recited in claim 1, wherein said galactomannan gum is selected from the group consisting of guar gum, derivatised guar gum, xanthum gum, locust bean gum, and sodium alginate.

12. An absorbent composition as recited in claim 1, wherein said galactomannan gum is selected from the group consisting of natural guar, hydroxypropyl guar, hydroxyethyl guar, carboxymethyl guar, carboxymethyl hydroxypropyl guar, guar hydroxypropyltrimonium chloride, and mixtures thereof.

13. An absorbent composition as recited in claim 1, wherein said borate compound is selected from the group consisting of borates, metaborates, and perborates.

14. An absorbent composition as recited in claim 1, wherein said borate compound is anhydrous borax.

15. An absorbent composition as recited in claim 1, wherein said borate compound is selected from the group consisting of sodium metaborate; sodium metaborate, tetrahydrate; sodium metaborate peroxyhydrate; sodium tetraborate; sodium tetraborate, decahydrate, sodium tetraborate, pentahydrate, and mixtures thereof.

16. An absorbent composition as recited in claim 1, wherein said dicarboxylic acid is selected from the group consisting of oxalic acid, succinic acid, adipic acid, pimelic acid, suberic acid, azelaic acid, sebacic acid, fumaric acid, phthalic acid, malonic acid, glutaric acid, maleic acid, undecyclic acid, lauric acid, myristic acid, pentadecyclic acid, tridecanoic acid, and mixtures thereof.

17. An absorbent composition a recited in claim 2, wherein said silica is selected from the group consisting of precipitated silica and fumed silica.

18. An absorbent composition as recited in claim 4, wherein said dust control component comprises polytetrafluoroethylene.

19. An absorbent composition as recited in claim 6, wherein said dust control component comprises polytetrafluoroethylene.

20. An absorbent composition as recited in claim 9, wherein said dust control component comprises polytetrafluoroethylene.

21. An absorbent composition as recited in claim 10, wherein said dust control component comprises polytetrafluoroethylene.

22. An absorbent composition as recited in claim 3, wherein said conventional absorbent material comprises one or more of the following: particulated clay, cellulose fiber, cellulose fluff, peat moss, paper, wood fluffs, and mixtures thereof.

23. An absorbent composition as recited in claim 4, wherein said conventional absorbent material comprises one or more of the following: particulated clay, cellulose fiber, cellulose fluff, peat moss, paper, recycled post consumer waste, wood fluffs, and mixtures thereof.

24. An absorbent composition as recited in claim 5, wherein said conventional absorbent material comprises one or more of the following: particulated clay, cellulose fiber, cellulose fluff, peat moss, paper, recycled post consumer waste, wood fluffs, and mixtures thereof.

25. An absorbent composition as recited in claim 6, wherein said conventional absorbent material comprises one or more of the following: particulated clay, cellulose fiber, cellulose fluff, peat moss, paper, recycled post consumer waste, wood fluffs, and mixtures thereof.

26. An absorbent composition as recited in claim 7, wherein said conventional absorbent material comprises one or more of the following: particulated clay, cellulose fiber, cellulose fluff, peat moss, paper, recycled post consumer waste, wood fluffs, and mixtures thereof.

27. An absorbent composition as recited in claim 8, wherein said conventional absorbent material comprises one or more of the following: particulated clay, cellulose fiber, cellulose fluff, peat moss, paper, recycled post consumer waste, wood fluffs, and mixtures thereof.

28. An absorbent composition as recited in claim 9, wherein said conventional absorbent material comprises one or more of the following: particulated clay, cellulose fiber, cellulose fluff, peat moss, paper, recycled post consumer waste, wood fluffs, and mixtures thereof.

29. An absorbent composition as recited in claim 10, wherein said conventional absorbent material comprises one or more of the following: particulated clay, cellulose fiber, cellulose fluff, peat moss, paper, recycled post consumer waste, wood fluffs, and mixtures thereof.

30. An absorbent composition to promote clumping and facilitate subsequent removal of urine in said absorbent composition comprising:
  a. conventional absorbent material, wherein said conventional absorbent material has a particle size between 8 and 50 mesh.
  b. guar gum powder having a particle size distribution allowing at least 90% of said guar gum powder to pass through a 200 mesh sieve;
  c. anhydrous borax, in an amount sufficient to provide cross linking of said absorbent composition upon the addition of said urine; and
  d. a dicarboxylic acid, in an amount sufficient to lower the pH of said absorbent composition to a level where said borate compound and said guar gum powder agglomerate said absorbent composition upon the introduction of said urine.

31. An absorbent composition as recited in claim 30, wherein said dicarboxylic acid is added in an amount sufficient to provide a clump strength in excess of about seven pounds per square inch within 24 hours of the addition of said urine.

32. An absorbent composition as recited in claim 31, further comprising a dust control element.

33. An absorbent composition as recited in claim 31, wherein said conventional absorbent material is selected from the group comprises one or more of the following: particulated clay, cellulose fiber, cellulose fluff, peat moss, paper, wood fluffs, and mixtures thereof.

* * * * *